(12) United States Patent
Li

(10) Patent No.: US 12,386,622 B2
(45) Date of Patent: Aug. 12, 2025

(54) PROCESSOR, METHOD FOR EXECUTING AN INSTRUCTION ON A PROCESSOR, AND COMPUTER

(71) Applicant: METAX INTEGRATED CIRCUITS (SHANGHAI) CO., LTD., Shanghai (CN)

(72) Inventor: Ying Li, Shanghai (CN)

(73) Assignee: METAX INTEGRATED CIRCUITS (SHANGHAI) CO., LTD., Shanghai (CN)

( * ) Notice: Subject to any disclaimer, the term of this patent is extended or adjusted under 35 U.S.C. 154(b) by 7 days.

(21) Appl. No.: 18/273,971

(22) PCT Filed: Dec. 17, 2021

(86) PCT No.: PCT/CN2021/139364
§ 371 (c)(1),
(2) Date: Jul. 24, 2023

(87) PCT Pub. No.: WO2022/161013
PCT Pub. Date: Aug. 4, 2022

(65) Prior Publication Data
US 2024/0403059 A1 Dec. 5, 2024

(30) Foreign Application Priority Data
Jan. 27, 2021 (CN) .................... CN202110110263.8

(51) Int. Cl.
*G06F 9/38* (2018.01)
*G06F 9/30* (2018.01)

(52) U.S. Cl.
CPC ............ *G06F 9/38* (2013.01); *G06F 9/30101* (2013.01); *G06F 9/3888* (2023.08)

(58) Field of Classification Search
CPC .......................... G06F 9/30101; G06F 9/3888
See application file for complete search history.

(56) References Cited

U.S. PATENT DOCUMENTS

2004/0210886 A1   10/2004   Jarp et al.
2012/0017067 A1   1/2012    Sankaran et al.
(Continued)

FOREIGN PATENT DOCUMENTS

CN   102640132 A   8/2012
CN   103460180 A   12/2013
(Continued)

*Primary Examiner* — Michael J Metzger

(57) ABSTRACT

The invention provides a processor, a method for executing an instruction on a processor and a computer. The processor comprises at least one single-instruction multiple-thread processing units. The single-instruction multiple-thread processing unit includes a plurality of warps for executing an instruction; a shared register group, which includes a plurality of general-purpose registers shared by the plurality of warps; and a predicate base address register, which is configured to: correspond to the plurality of warps; and indicate a base address for a subset of the plurality of general-purpose registers that serves as a predicate register for the warp in the shared register group, wherein: the warp performs a predicated execution for an instruction in view of a predicate value in the subset of the plurality of general-purpose registers that serves as the predicate register for the warp.

14 Claims, 4 Drawing Sheets

(56) References Cited

U.S. PATENT DOCUMENTS

2015/0324198 A1    11/2015  Alsup et al.
2015/0324949 A1*   11/2015  Alsup ................... G06F 9/3851
                                                           345/522
2019/0347125 A1*   11/2019  Sankaran .............. G06F 9/3842
2022/0206841 A1*   6/2022   Beckmann .......... G06F 9/30098

FOREIGN PATENT DOCUMENTS

CN        108701022 A      10/2018
WO        2020186630 A1     9/2020

* cited by examiner

PROCESSOR, METHOD FOR EXECUTING AN INSTRUCTION ON A PROCESSOR, AND COMPUTER

RELATED APPLICATIONS

The application is the U.S. national phase of PCT/CN2021/139364 filed Dec. 17, 2021, which claims the benefit of CN202110110263.8 filed Jan. 27, 2021, each of which is incorporated herein by reference in its entirety.

FIELD OF THE INVENTION

The invention relates to the technical field of processors, and in particular to a processor, a method for executing an instruction on a processor and a computer.

BACKGROUND OF THE INVENTION

At present, a single-instruction multithreading (SIMT) core is usually adopted in a multi-core processing chip such as a CPU, a GPU and the like. The SIMT core can have a plurality of basic units for executing an instruction which are called warps (WARP), and the size of the warps indicate the number of parallel threads of the SIMT. Each warp usually contains a variety of special registers, among which a predicate register is the key method for efficiently controlling branch instructions in a GPU. In the chip instruction system of NVIDIA, generally, one warp has 32 parallel threads, and each warp has seven 32-bit predicate registers P0-P6. A bit in each predicate register represents whether the corresponding thread in the warp is true (valid) or false (invalid), and the single-instruction multithreading (SIMT) core performs a predicated execution for the instruction according to the truth of the bit in the predicate register and executes the target instruction on the valid thread in each warp. The use of the predicate register can reduce the call of IF-ELSE and other instructions in the execution for an instruction, reduce the final number of instructions in the program, and improve the execution performance.

However, the inventor of the present application has found that in the existing GPU chip system, the predicate registers that corresponds to each warp are fixedly set, and the number is too small, so that the predicate registers are not enough in complex scenarios, such as complex IF-ELSE nesting and Switch-Case branch conditional instructions. When the resources are limited, each warp still can only use 7 predicate registers, and the remaining resources cannot be fully utilized. In addition, the predicate registers of each warp cannot be shared by multiple warps, and the existing mechanism also results in a loss of system performance, requiring more instructions to be executed to achieve the desired functionality.

OBJECTS AND SUMMARY OF THE INVENTION

The invention provides a processor, a method for executing an instruction on a processor and a computer, so as to improve the existing predicate register mechanism, realize the dynamic expansion of predicate register resources of each warp in a processing core, realize the sharing of the resources among a plurality of warps and improve the processing performance of a processor.

In some embodiments of the present application, a processor is presented that may include at least one single-instruction multiple-thread processing units, which may include:

a plurality of warps for executing an instruction;
a shared register group that may include a plurality of general-purpose registers shared by the warps; and
a predicate base address register which can be configured to correspond to each warp and is used for indicating a base address for a subset of plurality of general-purpose registers that serves as a predicate register for the warp in the shared register group; wherein each warp can perform a predicated execution for an instruction in view of a predicate value in the subset of plurality of general-purpose registers that serves as predicate registers for each warp.

In a preferred embodiment, the shared register group may be configured to be dynamically allocated among the warps.

In a preferred embodiment, each warp may be dynamically allocated with the subset of plurality of general-purpose registers in the shared register group that serves as predicate registers.

In a preferred embodiment, the value of the predicate base address register may be dynamically determined in view of a specific instruction.

In a preferred embodiment, the single-instruction multiple-thread processing unit can further include a shared register base address register which is configured to correspond to each warp and used for indicating a base address for a subset of plurality of general-purpose registers allocated to each warp in the shared register group; wherein, the predicate registers for each warp may perform physical addressing in view of a base address for a subset of plurality of general-purpose registers allocated to the warp indicated in the shared register base address register, the base address for a subset of plurality of general-purpose registers that serves as predicate registers for the warp indicated in the predicate base address register and the index address of the predicate register in the set of general-purpose registers that serves as a predicate register for the warp.

In a preferred embodiment, the base address of the subset of plurality of general-purpose registers that serves as predicate registers for each warp indicated in the predicate base address register represents the index address of the first predicate register for the warp in the subset of plurality of general-purpose registers allocated to that warp in the shared register group.

In a preferred embodiment, when the warp performs the predicated execution for the instruction in view of predicate values in the subset of plurality of general-purpose registers that serves as predicate registers for each warp, the warp executes the instruction in the valid thread according to the valid thread indicated by a predicate value in a predicate register specified in the instruction.

In a preferred embodiment, the single-instruction multiple-thread processing unit may further include:

a thread mask register for storing a default thread mask of each warp, the thread mask being used for indicating valid threads for executing an instruction in each warp; wherein each of the warps executes the instruction in view of the valid thread indicated in the thread mask by a sign of the non-predicate register specified in the instruction.

In other embodiments of the present application, a method for executing an instruction on a processor is presented. The processor may include at least one single-instruction multiple-thread processing units, which may include a plurality of warps for executing an instruction; a shared register group that may include a plurality of general-purpose registers shared by the warps; a predicate base address register which can be configured to correspond to each warp and is used for indicating a base address for a subset of plurality of general-purpose registers that serves as the predicate register for the warp in the shared register group. The method may include:

transcoding a target instruction executed by each warp to obtain a predicate register specified in the target instruction;

obtaining a physical address of the predicate register specified in the target instruction in view of a base address for a subset of plurality of general-purpose registers that serves as a predicate register for the warp indicated by the predicate base address register;

obtaining a predicate value in the predicate register specified in the target instruction in view of the physical address of the predicate register specified in the target instruction; and performing a predicated execution for the target instruction in view of the predicate value in the predicate register specified in the target instruction.

In a preferred embodiment, the shared register group may be configured to be dynamically allocated among the warps.

In a preferred embodiment, the subset of plurality of general-purpose registers in the shared register group may be dynamically allocated as predicate registers for each warp.

In a preferred embodiment, the method may further include dynamically determining, in view of a special instruction, a base address for a subset of plurality of general-purpose registers that serves as a predicate register for the warp indicated by the predicate base address register that corresponds to each warp.

In a preferred embodiment, the single-instruction multiple-thread processing unit can further include a shared register base address register which is configured to correspond to each warp and is used for indicating a base address for a subset of plurality of general-purpose registers allocated to each warp in the shared register group; wherein, the obtaining the physical address of the predicate register specified in the target instruction may further include obtaining the physical address of the predicate register specified in the target instruction in view of the base address for a subset of plurality of general-purpose registers allocated to the warp indicated in the shared register base address register, the base address for a subset of plurality of general-purpose registers that serves as predicate registers for the warp indicated in the predicate base address register and the index address of the predicate register specified in the target instruction in the set of general-purpose registers that serves as predicate registers for the warp.

In a preferred embodiment, the base address of the subset of plurality of general-purpose registers indicated in the predicate base address register represents the index address of the first predicate register for the warp in the subset of plurality of general-purpose registers allocated to the warp in the shared register group.

In a preferred embodiment, the performed predicated execution for the target instruction in view of the predicate value in the predicate register specified in the target instruction may include:

executing the target instruction in the valid thread in view of the valid thread indicated by a predicate value in a predicate register specified in the target instruction.

In a preferred embodiment, the single-instruction multiple-thread processing unit may further include a thread mask register for storing a default thread mask of each warp, the thread mask being used to indicate valid threads for executing an instruction in each warp; wherein the method may further include executing the target instruction in view of the valid thread indicated in the thread mask by a sign of the non-predicate register specified in the target instruction.

In yet other embodiments of the present application, a computer is presented that may include a processor as described in any of the preceding embodiments.

Compared with the related art, the present application at least has the following beneficial effects: through the setting of the predicate base address register that corresponds to each warp, the subset of plurality of general-purpose registers in a shared register group can be dynamically allocated for each warp to be that serves as a predicate register. Thus, the special predicate register inherent in each warp in the original processor architecture can be cancelled, so as to dynamically expand predicate register resources of each warp, from the existing 7 predicate registers to 256.

In addition, in this embodiment of the present application, the predicate register resources of each warp can be shared by a plurality of warps to realize the full utilization of the processor resources; meanwhile, the use of a large number of special predicate registers can also be reduced in the processor, so as to reduce the overhead of switching instructions and improve the instruction processing performance.

BRIEF DESCRIPTION OF FIGURES

The features, objects, and advantages of the present application will be more fully understood from the following detailed description of non-limiting embodiments, taken in conjunction with the accompanying drawings, in which.

DETAILED DESCRIPTION OF THE EMBODIMENTS

Figure 1:
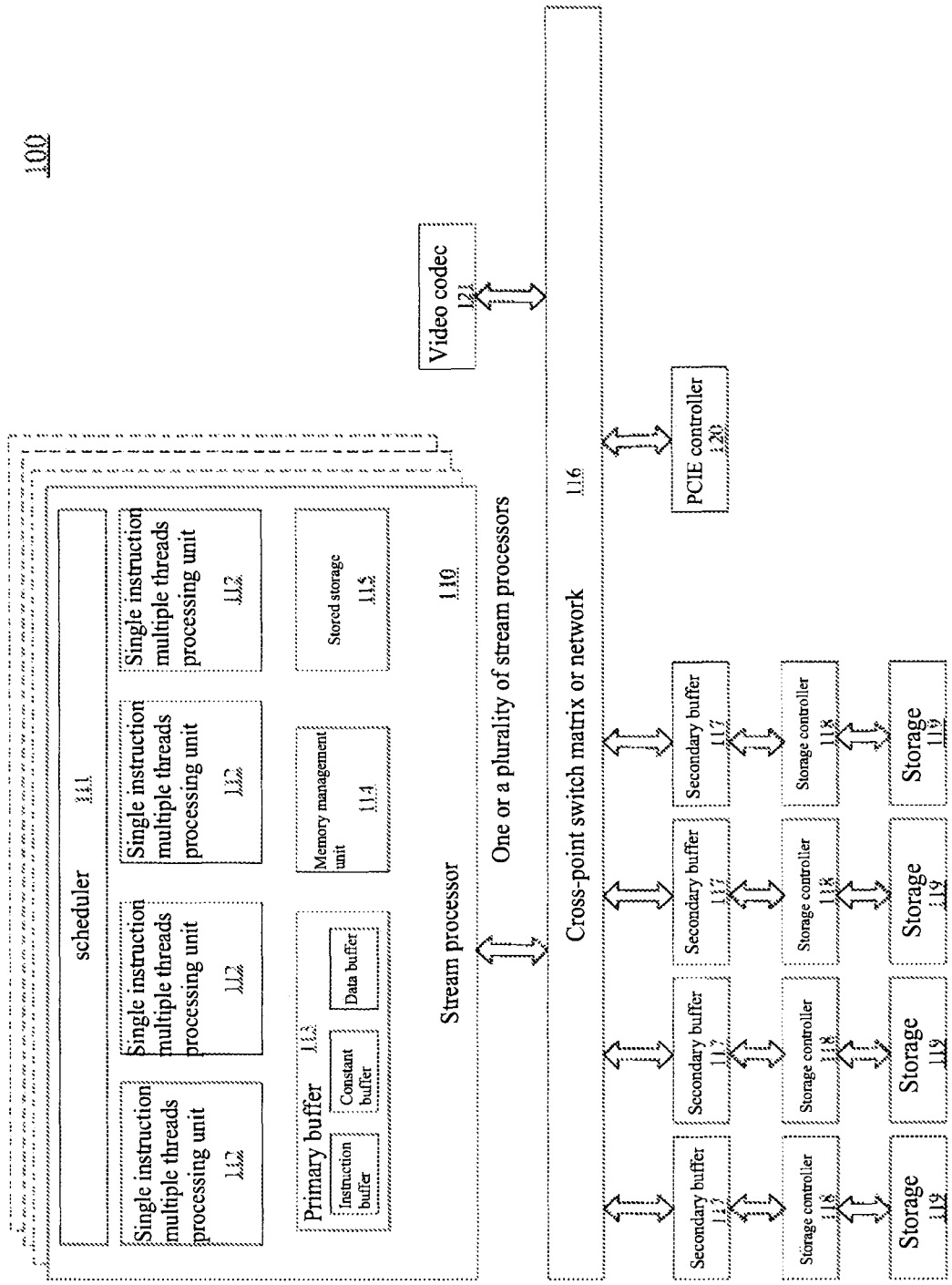
FIG. 1 is a schematic diagram of an exemplary structure of a conventional graphics processing unit (GPU) chip.

The technical solution of the present application is clearly and completely described below through embodiments and in conjunction with the accompanying drawings, but the present application is not limited to the embodiments described below. In view of the following embodiments, all other embodiments obtained by those of ordinary skill in the art without creative work are within the scope of the present application. Parts irrelevant to the description of the exemplary embodiments are omitted in the drawings for the sake of clarity.

It is to be understood that terms such as "include" or "have" or the like in this specification are intended to indicate the presence of the features, numbers, steps, acts, components, or their combinations disclosed in this specification, and do not exclude the possibility that one or more other features, numbers, steps, acts, components, or their combinations may be present or added. "A plurality of" in this application may be generally taken to mean two or more.

FIG. 1 is a schematic diagram of an exemplary structure of a conventional graphics processing unit (GPU) chip 100. As shown in FIG. 1, the GPU chip 100 typically includes one or more stream processors 110. The stream processor (SP) 110 reads and writes data with one or more L2 caches 117 and a PCIE controller 120 through a crossbar switch matrix or crossbar switch network 116. In addition, the GPU chip 100 may further include a video codec 121 and/or other processing cores (not shown).

The stream processor 110 includes an instruction scheduler (SEQ) 111, at least one single-instruction multiple-thread (SIMT) processing units 112, one or more L1 caches 113, a memory management unit (MMU) 114, and a shared memory 115. A plurality of single-instruction multiple-thread (SIMT) processing units 112 may read and write data from and to the shared memory 115, thereby enabling data exchange between multiple threads.

In the single-instruction multiple-thread (SIMT) processing unit 112, a warp (WARP) is a basic unit for executing an instruction, and the warp (WARP) includes a plurality of threads executing the same instruction in parallel with different data resources. The number of threads executing in parallel in a warp is the size of the warp (WARP SIZE), which is usually 16, 32 or 64 parallel threads. A single-instruction multiple-thread (SIMT) processing unit may include 8-16 WARPs, while a stream processor may include up to 32-128 WARPs.

Figure 2:
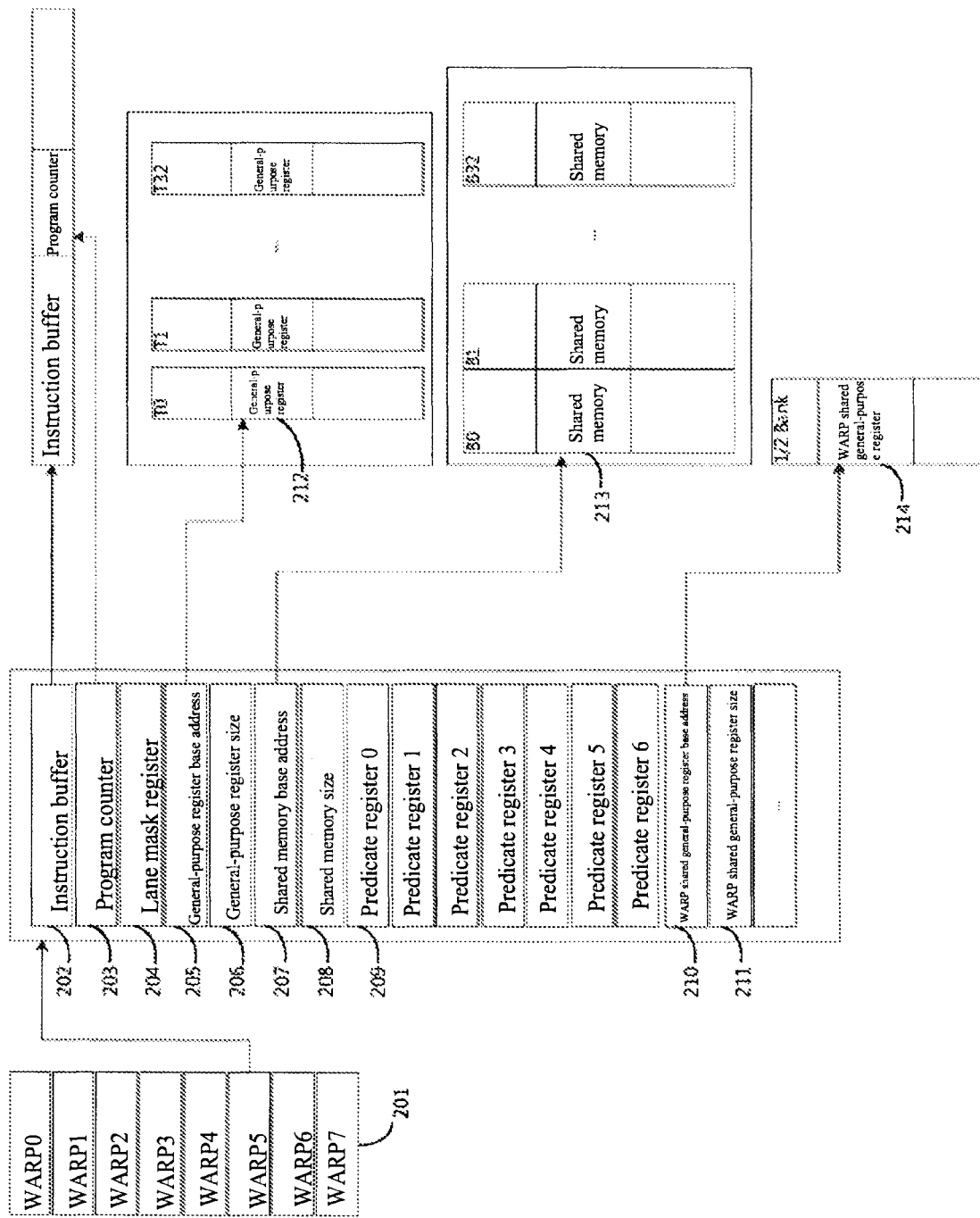
FIG. 2 is a schematic diagram of the structure of the SIMT unit of the conventional GPU.

FIG. 2 is a schematic diagram of a SIMT unit 200 of a conventional GPU. FIG. 2 illustrates an example of a SIMT unit with 8 WARPs, each WARP with a size of 32. As shown in FIG. 2, each WARP 201 in the SIMT unit contains various special registers:

An instruction buffer 202 for providing an instruction buffer for each WARP.

A program counter (PC) 203, wherein the register is an address pointer to the address of the instruction it is to execute.

A thread mask register (LaneMask) 204 indicating the position of the valid thread in the WARP. For example, assuming a 32-bit Lane Mask of 0x01FFFFFF, it represents that threads 0-24 are valid and will participate in SIMT calculation instructions and asynchronous memory instructions, while the remaining threads 25-31 are invalid, and will not participate in calculation instructions or asynchronous memory instructions.

A general-purpose register base address (GPR Base) 205 and a general-purpose register size (GPR Size) 206 for indicating a base address and the size of the space of the GPR allocated to each thread (such as T0-T32 in the figure). In the SIMT unit of this example, each thread is allocated a GPR space, and the base addresses and sizes of the GPRs of all threads are the same, for example, GPR Base=64, and GPR Size=32. The register value for each thread may differ, and for example, the physical location of thread R6 is GPR base address+6, and the actual addressing address is 70.

A shared memory base 207 and a shared memory size 208 for indicating a base address and size of the shared memory space allocated to each WARP. Each WARP in the SIMT unit can be allocated a shared memory space, and each thread in the WARP can access the contents of the shared memory space.

Predicate registers (predicate 0-predicate 6) 209, which corresponds to 7 predicate registers of each WARP, for controlling whether each assembly instruction actually runs in a thread.

A WARP shared general-purpose register (hereinafter shared register) base address (WARP share GPR base) 210 and a WARP shared general-purpose register size (WARP share GPR size, hereinafter shared register size) 211, wherein the shared register is a general-purpose register allocated among WARPs, only one lane for the shared register in each WARP, each thread seeing the same value. For example, assuming the shared register base address WARP share GPR base=320, the physical addressing location for the shared register W16 is 336. The shared register size WARP share GPR size may vary from 32 logical addressing spaces to 256 depending on various hardware designs.

In the existing GPU system, 4 bits are usually used to specify the predicate register in the instruction to be executed, where:

Bit 0: a value of 0 represents that the original predicate value is used, and a value of 1 represents that the predicate value is negated;

Bit 1-3: 0 stands for predicate 0, 1 for predicate 1, 2 for predicate 2, 3 for predicate 3, 4 for predicate 4, 5 for predicate 5, 6 for predicate 6, 7 represents that the warp's thread mask (LaneMask) is used instead of predicate, or that all threads are true.

Assume that each predicate register value is expressed in binary, with bit 0 indicating that the corresponding thread (lane) is invalid and bit 1 indicating that the corresponding thread (lane) is valid. Then:

P5=0000 1111 1111 1111 1111 1111 1111 1111, indicating that threads 0-27 are True in 32 threads of a WARP.

!P5=1111 0000 0000 0000 0000 0000 0000 0000, indicating that threads 28-31 are True when P5 is negated.

An instruction @!P5 add R0, R1, R2 represents that an add instruction for the operands in registers R1, R2 is performed on threads 28-31.

The following explains how the predicate registers (predicate 0-predicate 6, hereinafter referred to as P0-P6) in the above example control the branch execution for an instruction with a specific instruction compilation execution.

Consider the following code in the GPU:
if ( ConditionA == true)
{
　result = a*b + c;
}
else
{
　result = a*c + b;
}
result = result*d + e;

Compile the above code, and the generated assembly instructions are as follows:

Compare_bool P1, R3, 1;
@P1 muladd.F32 R4, R5, R6, R7;
@!P1 muladd.F32 R4, R5, R7, R6;
Muladd.F32 R4, R4, R8, R9;

The first assembly instruction above performs the comparison operation, where the value of the condition ConditionA in the code is stored in the register R3, and the value of true is 1, which is an immediate value or a hardware-embedded immediate value. The result of this comparison operation is stored in the predicate register P1.

The second assembly instruction above represents to execute the multiply-add instruction muladd for the thread with bit 1 in the predicate register P1, wherein values of the variables a, b, and c are stored in the registers R5, R6, and R7, respectively. Result of the multiply-add instruction on the variables a, b, and c (result) is stored in the register R4. Assume, for example, that the hexadecimal value P1=0x0001FFFF in the predicate register P1, indicating that of the 32 thread in each WARP, threads 0-16 execute multiply-add instructions for the variables a, b, and c, and the remaining threads 17-31 do not.

The third assembly instruction above negates P1 to get! P1=0xFFFE0000, indicating that the threads 17-31 execute the multiply-add instructions for the variables a, c, and b, but do not execute the multiply-add instructions for the threads 0-16. Result of the multiply-add instruction on the variables a, c, and b (result) is stored in the register R4.

The fourth assembly instruction above does not specify a predicate register, indicating that all threads 0-31 execute the multiply-add instructions of the result of the above instructions (result) and the variables d and e, where the values of d and e are stored in registers R8 and R9, respectively.

It can be seen that during executing of conditional branches of the if-else, the executing of instruction branches can be conveniently realized by performing branch control on the conditional judgment result in the form of a predicate register.

However, as mentioned above, the predicate registers P0-P6 of each warp in the above example are fixedly set, and the number is too small to be sufficient in complex scenarios. Even when the resources are limited, each warp can only use 7 predicate registers, and the remaining resources cannot be fully utilized. In addition, the predicate register for the warp cannot be shared by multiple warps, which may also result in the loss of system performance. Therefore, the embodiment of the invention provides a processor and a method for executing an instruction on a processor, which improves the inherent mechanism of a predicate register in the existing processor, cancels a special predicate register fixedly set in each warp, replaces the special predicate register with a general-purpose register, realizes the dynamic expansion of predicate registers in each warp, surpasses the limit of 7 predicate registers of each warp, and can reduce the use of special registers, which is beneficial to the sharing of resources among the warps, and can improve the instruction processing performance.

Figure 3:
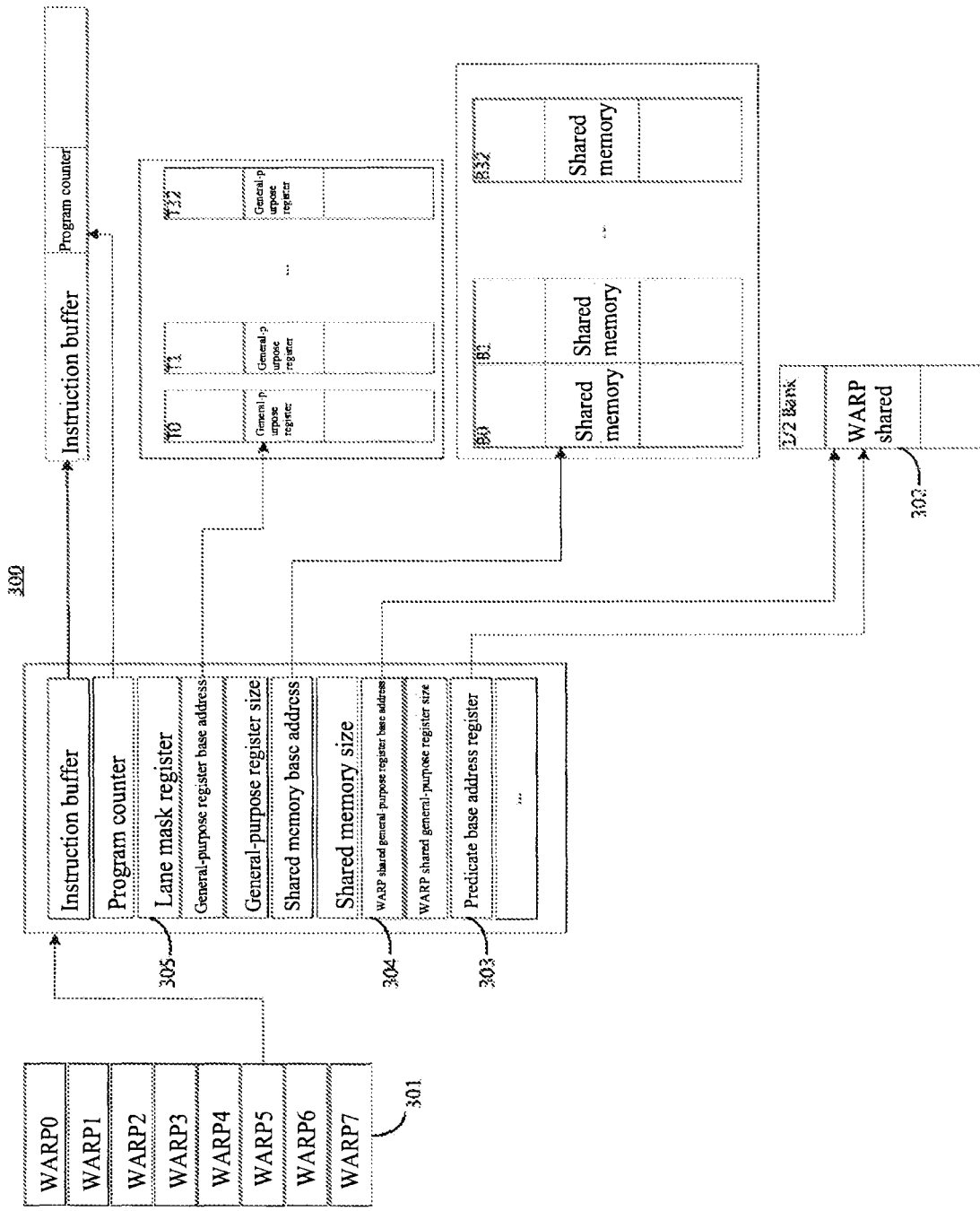
FIG. 3 is a schematic diagram of a part of a processor according to an embodiment of the present application.

FIG. 3 is a schematic diagram of a part of a processor according to an embodiment of the present application. As shown in FIG. 3, the processor of the embodiment of the present application includes:

at least one single-instruction multiple-thread processing units 300, which may include:

a plurality of warps 301 for executing an instruction;

a shared register group 302 that may include a plurality of general-purpose registers shared by the warps 301 (WARP share GPR); and a predicate base address register (predicate base) 303, which is configured to correspond to each warp 301, and is used to indicate the base address for a subset of plurality of general-purpose registers in the shared register group 302 that serves as the predicate register for the warp 301; wherein each warp performs a predicated execution for instructions in view of a predicate value in the subset of plurality of general-purpose registers that serves as predicate registers for each warp.

In this embodiment, the shared register group 302 may be dynamically allocated among the multiple warps 301 of the single-instruction multiple-thread processing unit 300. Through the setting the predicate base address register 303 that corresponds to each warp, the subset of plurality of general-purpose registers in the shared register group 302 can be dynamically allocated for each warp to be that serves as a predicate register. Thus, the special predicate register inherent in each warp in the original processor architecture can be cancelled, so as to dynamically expand predicate register resources of each warp from the existing 7 predicate registers to 256. In addition, in this embodiment of the present application, the predicate register resources of each warp can also be shared by a plurality of warps; meanwhile, the use of a large number of special predicate registers can also be reduced in the processor, so as to reduce the overhead of switching instructions and improve the instruction processing performance.

In some embodiments, the value of the predicate base address register 303 may be dynamically determined in view of a specific instruction. In this embodiment, for the purpose of exemplary description, the predicate base address register 303 may be designed as an 8-bit special register with a default value of 0, and a special instruction for setting a predicate base address set_predicate_base is added to set the value of the predicate base address register 303. The syntax format of the instruction is defined as follows:

set_predicate_base<immediate value offset address>

For example, the instruction set_predicate_base 32 may indicate that the value of the predicate base address register is configured to the general-purpose register (WARP share GPR) W32, i.e., predicate base=W32. The immediate value offset address 32 in the above instruction represents the index address of the first predicate register P0 allocated for the current warp in the subset of plurality of general-purpose registers allocated to the warp in the shared register group 302.

In some embodiments, the single-instruction multiple-thread processing unit 300 further includes:

a shared register base address register (WARP share GPR base) 304, which is configured to correspond to each warp 301 and is used to indicate the base address for a subset of plurality of general-purpose registers allocated to each warp 301 in the shared register group 302.

In this embodiment, the predicate registers for each warp may perform physical addressing in view of the base address of the subset of plurality of general-purpose registers indicated in the shared register base address register 304, the base address of the subset of plurality of general-purpose registers indicated in the predicate base address register 303, and the index address of the predicate register in the set of general-purpose registers that serves as the predicate register for each warp.

In some embodiments, when the warp performs the predicated execution for the instruction in view of predicate values stored in the subset of plurality of general-purpose registers that serves as predicate registers for each warp, the warp executes the instructions in the valid thread according to the valid thread indicated by the predicate value in the predicate register specified in the instruction.

In some embodiments, the single-instruction multiple-thread processing unit 300 further includes:

a thread mask register (LaneMask) 305 for storing a default thread mask of each warp 301, the thread mask being used to indicate valid threads for executing an instruction in each warp 301.

In this embodiment, each warp 301 may execute the instruction in view of the valid thread indicated in the thread mask by a sign of the non-predicate register specified in the instruction to be executed.

Assume that seven general-purpose registers (WARP share GPR) starting from the address of the general-purpose register indicated by the predicate base address register (predicate base) are that serves as the predicate registers of this warp, for example, P0-P6 are represented by general-purpose registers (WARP share GPR) W32-W38, the instruction encoding of the existing predicate register remains unchanged, and the 4 Bits instruction encoding is continued to be that serves as follows:

Bit0: a value of 0 represents that the original predicate value is used, and a value of 1 represents that the predicate value is negated;

Bit1-3: values of 0-6 stands for P0-P6, respectively, and a value of 7 represents that the original thread mask (LaneMask) is used instead of the predicate register.

It should be noted that, in some embodiments, the single-instruction multiple-thread processing unit 300 in the embodiment of the present application may also include other special registers as shown in FIG. 2, such as the instruction buffer 202, the program counter (PC) 203, the general-purpose register base address (GPR Base) 205 and the general-purpose register size (GPR Size) 206, the shared memory base 207 and the shared memory size 208, the shared register size register (WARP share GPR size) 211 and the like, details of which will not be repeated here.

In the following, several specific instruction examples are used to further explain the specific implementation mode of the embodiment of the application.

It is assumed that the predicate base address register Predicate Base=32 and the shared register base address register Warp Share GPR Base=320 in the current processing unit. Depending on the setting of the predicate base address register, the general-purpose register W32 represents the predicate register P0 for the warp, correspondingly, the general-purpose register W33 represents P1, and so on, and the general-purpose register W38 represents P6. The general-purpose register W32 represents that the index address of the general-purpose register is 32, and the physical address is the base address of the shared register that corresponds to the warp plus the index address, i.e., 320+32=352.

A code example of the present application is described below. The code example could be:

set_predicate_base 32

@P1 FMA R4, R5, R6, R7

The above instruction represents that a special instruction for setting the predicate base address is executed to set the predicate base address register Predicate Base to 32, that is, the general-purpose register W32 is that serves as the predicate register P0 of the current line bundle, and the default value is no longer 0.

It is assumed that the general-purpose registers W32=0x 01 FF FFFF, W33=0x 80 FF FFFF, the thread mask register LaneMask=0x FFFFFFFF, and the above instruction represents that the instruction that corresponds to the current program counter PC is to execute the fused multiply-add FMA instruction. A fused multiply-add FMA instruction is executed in view of the predicate register P1.

Since the general-purpose register W33 represents the predicate register P1, the FMA instruction is invalid for threads 24-30 in the warp, but is valid for threads 0-23, that is, the FMA instruction performs the fused multiply-add operation on the operands in registers R5, R6, and R7 for threads 0-23, and outputs the result to the register R4.

Another code example of the present application is described below. The other code example could be:

set_predicate_base 8

@!P0 sub R7, R1, R2

The above instruction represents that a special instruction for setting the predicate base address is executed to set the predicate base address register Predicate Base to 8, that is, the general-purpose register W8 is the predicate register P0 of the current line bundle, W8 is that serves as P0, and the SUB instruction is executed after negating P0.

It is assumed that the general-purpose register W8=0x 00 FF FFFF, then! P0=0x FF 00 00 00, and the above instruction SUB is invalid for threads 0-23 and valid for threads 24-31, that is, the subtraction of the operands in registers R1 and R2 is performed for threads 24-31, and the result is output to register R7.

Yet another code example of the present application is described below. The further code example could be:

set_predicate_base 16

@!P1 sub R7, R1, R2

The above instruction represents that a special instruction for setting the predicate base address is executed to set the predicate base address register Predicate Base to 16, that is, the general-purpose register W16 is the predicate register P0 of the current line bundle, and W17 is the predicate register P1 of the current line bundle.

It is assumed that the general-purpose register W17=0x 00 0F FF FF, then! P1=0x FF F0 00 00, the above instruction SUB is invalid for threads 0-19 and valid for threads 20-31, that is, the above instruction SUB performs the subtraction of the operands in registers R1 and R2 for threads 20-31, and outputs the result to the register R7.

Figure 4:
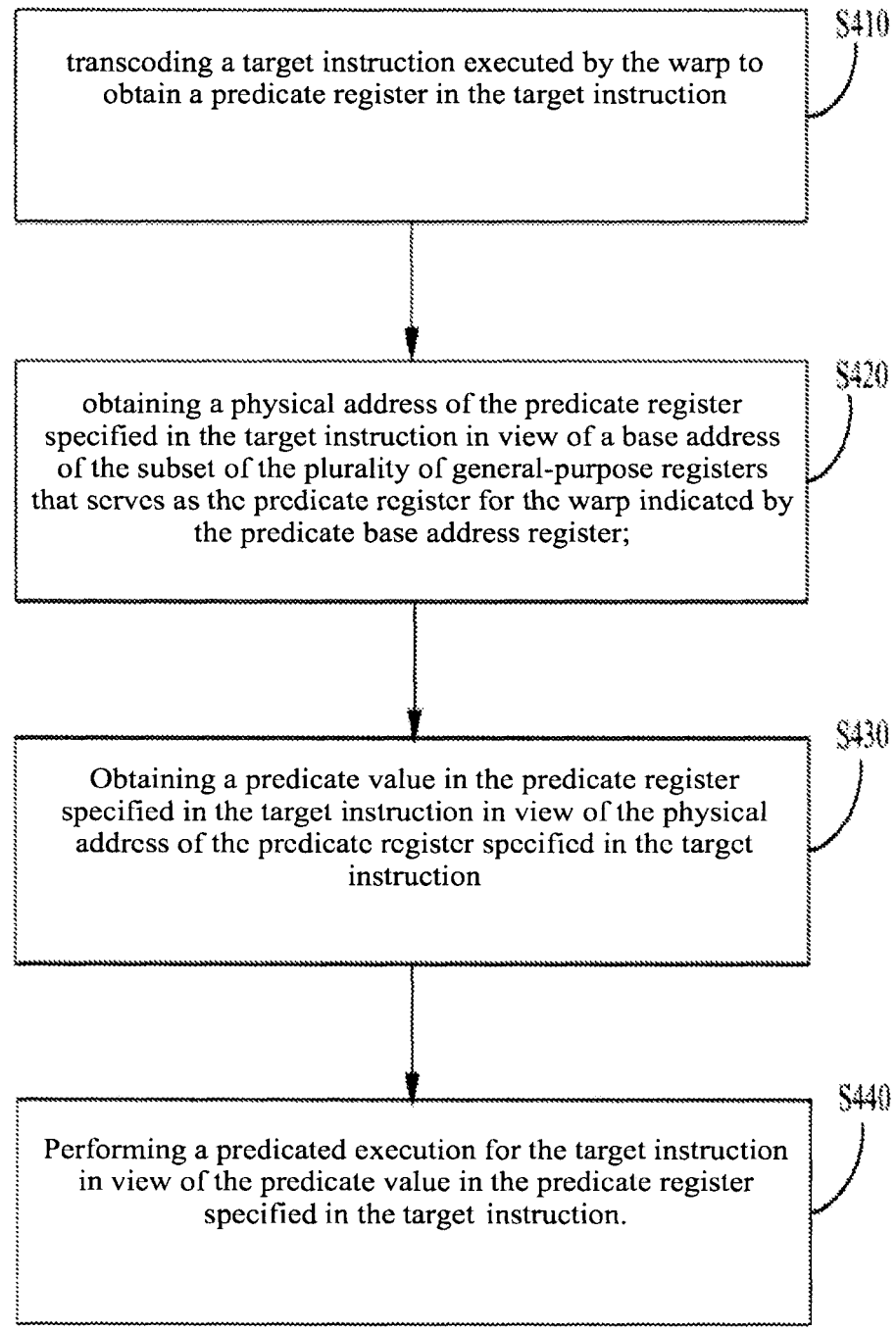
FIG. 4 is a flowchart of a method for executing an instruction on a processor according to an embodiment of the present application.

FIG. 4 is a flowchart of a method for executing an instruction on a processor according to an embodiment of the present application. As shown in FIG. 4, the method for executing an instruction of the embodiment of the present application is applicable to the processor of any of the foregoing embodiments, and the method includes the following steps:

Step S410, transcoding a target instruction executed by each warp to obtain a predicate register specified in the target instruction;

Step S420, obtaining a physical address of the predicate register specified in the target instruction in view of a base address for a subset of plurality of general-purpose registers that serves as a predicate register for the warp indicated by the predicate base address register;

Step S430: Obtaining a predicate value in the predicate register specified in the target instruction in view of the physical address of the predicate register specified in the target instruction; and Step S440: performing a predicated execution for the target instruction in view of the predicate value in the predicate register specified in the target instruction.

By setting a predicate base address register that corresponds to each warp, the method for executing an instruction of the embodiment can dynamically allocate the subset of a plurality of general-purpose registers in the shared register group to be that serves as a predicate register for each warp. Thus, the special predicate register inherent in each warp in the original processor architecture can be cancelled, so as to dynamically expand predicate register resources of each warp. During the executing of the instructions, the number of the predicate registers can be dynamically expanded according to different requirements, from the existing 7 predicate registers to up to 256. This embodiment can reduce the use of a large number of special predicate registers in the processor, reduce the overhead of switching instructions, and improve the instruction processing performance.

In some embodiments, the method further includes dynamically determining, in view of a special instruction, a base address for a subset of plurality of general-purpose registers that serves as a predicate register for the warp indicated by the predicate base address register that corresponds to each warp.

In some embodiments, the obtaining the physical address of the predicate register specified in said target instruction further includes: obtaining the physical address of the predicate register specified in the target instruction in view of the base address for a subset of plurality of general-purpose registers allocated to the warp indicated in the shared register base address register, the base address for a subset of plurality of general-purpose registers that serves as predicate registers for the warp indicated in the predicate base address register and the index address of the predicate register specified in the target instruction in the set of general-purpose registers that serves as predicate registers for the warp.

In some embodiments, the base address of the subset of plurality of general-purpose registers indicated in the predicate base address register represents the index address of the first predicate register for the warp in the subset of plurality of general-purpose registers allocated to the warp in the shared register group.

In some embodiments, the performed predicated execution for the target instruction in view of the predicate value in the predicate register specified in the target instruction further includes executing the target instruction in the valid thread in view of the valid thread indicated by a predicate value in a predicate register specified in the target instruction.

In some embodiments, the method further includes executing the target instruction in view of the valid thread indicated in the thread mask of the warp by a sign of the non-predicate register specified in the target instruction.

Embodiments of the present application also provide a computer including a processor as described in any of the preceding embodiments.

It is noted that in some embodiments, the computer may include, for example, at least one processor, an associated memory, and a plurality of input/output (I/O) devices. When executing a computer program, the computer can process information according to the computer program and generate output information via input/output (I/O) devices. Any computer containing the processor described in the embodiments of the present application, including but not limited to a personal computer, a laptop computer, a tablet computer, a server, a workstation, a mobile terminal, a graphics processing apparatus, and other computer systems embedded in processors, falls within the scope of the present application.

Some of the features of the embodiments of the present application may be implemented in a computer program or a computer program product for running on a computer system, and may include code portions for performing steps of a method according to the present application when running on a programmable device such as a computer system or enabling a programmable device to perform functions of an apparatus or device according to the present application.

The processor and the method for executing an instruction on a processor provided by the embodiments of the present application can be applied to multi-core processor chips such as a central processing unit (CPU), a graphics processing unit (GPU), a digital processing unit (DSP), a field programmable gate array (FPGA), an artificial intelligence (AI) chip, a video coding and transcoding chip (Video Code), and the like, thereby realizing the efficient execution for the branch conditional instruction and improving the instruction processing performance.

The steps, units or modules involved in the embodiments of the present application may be implemented by a hardware circuit or a combination of software and hardware logics. Embodiments of the present application are not limited to those described above, and various changes and modifications in forms and details may be made by one of ordinary skill in the art without departing from the spirit and scope of the present application, and these are considered to fall within the scope of the present application.

INDUSTRIAL APPLICABILITY

The invention discloses a processor, a method for executing an instruction on a processor and a computer. The device includes at least one single-instruction multiple-thread processing units including a plurality of warps for executing an instruction; a shared register group that may include a plurality of general-purpose registers shared by the warps; and a predicate base address register which can be configured to correspond to each warp and is used for indicating a base address for a subset of plurality of general-purpose registers that serves as the predicate register for the warp in the shared register group; wherein each warp performs a predicated execution for an instruction in view of a predicate value in the subset of plurality of general-purpose registers that serves as predicate registers for each warp. The embodiment of the invention can cancel the inherent special predicate register for the warp in the original processor architecture, dynamically expand predicate register resources of each warp, fully utilize the processor resources, reduce the overhead of switching instructions and improve the instruction processing performance.

Furthermore, it is to be understood that the processor, the method for executing an instruction on a processor, and the computer of the present disclosure are reproducible and may be used in a variety of industrial applications. For example, the processor, the method for executing an instruction on a processor, and the computer of the present disclosure may be used in the technical field of processor.

What is claimed is:

1. A processor, comprising at least one single-instruction multiple-thread processing unit, which includes:
   a plurality of warps for executing an instruction;
   a shared register group, which includes a plurality of general-purpose registers shared by the plurality of warps; and
   a predicate base address register, which is configured to:
      correspond to the plurality of warps; and
      indicate a base address for a subset of the plurality of general-purpose registers that serves as a predicate register for the warp in the shared register group, wherein:
   the warp performs a predicated execution for an instruction in view of a predicate value in the subset of the plurality of general-purpose registers that serves as the predicate register for the warp;
   the single-instruction multiple-thread processing unit further includes a shared register base address register, which is configured to:
      correspond to the plurality of the warps; and
      indicate a base address for the subset of the plurality of general-purpose registers that is allocated to the warp in the shared register group; and
   the predicate register for the warp performs physical addressing in view of:
      the base address of the subset of the plurality of general-purpose registers that is allocated to the warp indicated by the shared register base address register;
      the base address of the subset of the plurality of general-purpose registers that serves as the predicate register for the warp indicated by the predicate base address register; and an index address of the predicate register in the subset of the plurality of general-purpose registers that serves as the predicate register for the warp.

2. The processor in claim 1, wherein the shared register group is configured to be dynamically allocated among the plurality of warps.

3. The processor in claim 1, wherein the subset of plurality of general-purpose registers in the shared register group is dynamically allocated to the warp as the predicate register.

4. The processor in claim 1, wherein a value of the predicate base address register is dynamically determined in view of a special instruction.

5. The processor in claim 1, wherein the base address of the subset of the plurality of general-purpose registers that serves as the predicate register for the warp indicated by the predicate base address register represents an index address of a first predicate register for the warp in the subset of the plurality of general-purpose registers that is allocated to the warp in the shared register group.

6. The processor in claim 5, wherein: when the warp performs the predicated execution for the instruction in view of the predicate value in the subset of the plurality of general-purpose registers that serves as the predicate register for the warp, the warp executes the instruction in a valid thread in view of the valid thread indicated by the predicate value in the predicate register specified in the instruction.

7. The processor in claim 1, wherein:
the single-instruction multiple-thread processing unit further includes a thread mask register for storing a default thread mask for the warp;
the thread mask indicates the valid thread for executing an instruction in the warp; and
the warp executes the instruction in view of the valid thread indicated in the thread mask by a sign of a non-predicate register specified in the instruction.

8. A method for executing an instruction on a processor, wherein:
the processor includes:
a plurality of warps for executing an instruction;
a shared register group, which includes a plurality of general-purpose registers shared by the plurality of warps; and
a predicate base address register, which is configured to:
correspond to the plurality of the warps; and
indicate a base address for a subset of the plurality of general-purpose registers that serves as a predicate register for the warp in the shared register group; and
the method comprises the steps of:
S1) transcoding a target instruction executed by the warp to obtain a predicate register in the target instruction;
S2) obtaining a physical address of the predicate register specified in the target instruction in view of a base address of the subset of the plurality of general-purpose registers that serves as the predicate register for the warp indicated by the predicate base address register;

S3) obtaining a predicate value in the predicate register specified in the target instruction in view of the physical address of the predicate register specified in the target instruction; and
S4) performing a predicated execution for the target instruction in view of the predicate value in the predicate register specified in the target instruction, wherein:
the single-instruction multiple-thread processing unit further includes a shared-register base address register, which is configured to:
correspond to the plurality of the warps; and
indicate a base address for the subset of the plurality of general-purpose registers that is allocated to the warp in the shared register group; and
S3 includes obtaining the physical address of the predicate register specified in the target instruction in view of:
the base address of the subset of the plurality of general-purpose registers allocated to the warp indicated by the shared register base address register;
the base address of the subset of the plurality of general-purpose registers that serves as the predicate register for the warp indicated by the predicate base address register; and
an index address of the predicate register in the subset of the plurality of general-purpose registers that serves as the predicate register for the warp.

9. The method in claim 8, wherein the shared register group is configured to be dynamically allocated among the plurality of warps.

10. The method in claim 8, further comprising the step of: dynamically allocating the subset of plurality of general-purpose registers in the shared register group to the warp as the predicate register.

11. The method in claim 8, further comprising the step of: dynamically determining, in view of a special instruction, the base address of the subset of the plurality of general-purpose registers that serves as the predicate register for the warp indicated by the predicate base address register that corresponds to the plurality of warps.

12. The method in claim 8, wherein the base address of the subset of the plurality of general-purpose registers that serves as the predicate register for the warp indicated by the predicate base address register represents an index address of a first predicate register for the warp in the subset of the plurality of general-purpose registers that is allocated to the warp in the shared register group.

13. The method in claim 12, wherein S4 includes executing the target instruction in a valid thread in view of the valid thread indicated by the predicate value of the predicate register specified in the target instruction.

14. The method in claim 8, wherein:
the single-instruction multiple-thread processing unit further includes a thread mask register for storing a default thread mask for the warp;
the thread mask indicates a valid thread for executing an instruction in the warp; and
the method further comprises the step of: executing the target instruction in view of the valid thread indicated in the thread mask by a sign of a non-predicate register specified in the target instruction.

* * * * *